United States Patent
Hamachi (10) Patent No.: US 9,055,428 B2
(45) Date of Patent: Jun. 9, 2015

(54) COMMUNICATION APPARATUS, CONTROL METHOD FOR COMMUNICATION APPARATUS, AND PROGRAM

(75) Inventor: Toshifumi Hamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 13/308,700

(22) Filed: Dec. 1, 2011

(65) Prior Publication Data

US 2012/0144199 A1 Jun. 7, 2012

(30) Foreign Application Priority Data

Dec. 7, 2010 (JP) ................................ 2010-272701

(51) Int. Cl.
- *H04W 8/26* (2009.01)
- *H04L 9/08* (2006.01)
- *H04L 29/06* (2006.01)
- *H04W 12/02* (2009.01)
- *H04L 29/12* (2006.01)
- *H04W 8/00* (2009.01)
- *H04W 84/18* (2009.01)

(52) U.S. Cl.
CPC ............... *H04W 8/26* (2013.01); *H04L 9/0838* (2013.01); *H04L 29/12028* (2013.01); *H04L 29/1232* (2013.01); *H04L 61/103* (2013.01); *H04L 61/2092* (2013.01); *H04L 63/062* (2013.01); *H04L 2209/80* (2013.01); *H04W 8/005* (2013.01); *H04W 12/02* (2013.01); *H04W 84/18* (2013.01)

(58) Field of Classification Search
CPC .............. H04L 9/0838; H04L 29/1232; H04L 61/2092; H04L 63/062; H04L 29/12028; H04L 61/103; H04L 63/0428; H04L 63/0442; H04L 2209/80; H04L 63/04428; H04W 8/26; H04W 12/02; H04W 84/18
USPC ........................... 713/168, 171, 172; 380/270
See application file for complete search history.

(56) References Cited

U.S. PATENT DOCUMENTS

| | | | |
|---|---|---|---|
| 6,691,227 B1 * | 2/2004 | Neves et al. ................. | 713/162 |
| 7,200,649 B1 * | 4/2007 | Batke et al. ................. | 709/222 |
| 2003/0196115 A1 * | 10/2003 | Karp ............................ | 713/201 |
| 2004/0003250 A1 * | 1/2004 | Kindberg et al. ............ | 713/171 |
| 2004/0168081 A1 * | 8/2004 | Ladas et al. ................ | 713/201 |
| 2005/0216738 A1 * | 9/2005 | Kita et al. ................... | 713/168 |
| 2006/0020796 A1 * | 1/2006 | Aura et al. .................. | 713/168 |
| 2006/0135209 A1 * | 6/2006 | Nakakita et al. ............ | 455/561 |
| 2006/0140410 A1 * | 6/2006 | Aihara ........................ | 380/273 |
| 2007/0088951 A1 * | 4/2007 | Nakajima .................... | 713/171 |
| 2008/0284855 A1 | 11/2008 | Umeyama | |
| 2009/0132731 A1 | 5/2009 | Nakamura | |

(Continued)

FOREIGN PATENT DOCUMENTS

| | | | |
|---|---|---|---|
| CN | 101884193 A | 11/2010 | |
| EP | 1538792 A1 | 6/2005 | |

(Continued)

*Primary Examiner* — Catherine Thiaw
(74) *Attorney, Agent, or Firm* — Canon USA IP Division (57) ABSTRACT

A communication apparatus of the present invention is a communication apparatus that communicates with a plurality of other communication apparatuses, and starts processing for setting an address for the communication apparatus using encrypted communication when encrypted communication with the plurality of communication apparatuses becomes possible by sharing encryption keys for encrypting communication with the other communication apparatuses.

4 Claims, 8 Drawing Sheets

(56) References Cited

U.S. PATENT DOCUMENTS

| | | | |
|---|---|---|---|
| 2010/0161982 A1* | 6/2010 | Oh et al. | 713/168 |
| 2010/0293379 A1* | 11/2010 | Nie | 713/169 |
| 2010/0296493 A1* | 11/2010 | Lee et al. | 370/336 |
| 2010/0329461 A1* | 12/2010 | Duplessis et al. | 380/270 |
| 2011/0103581 A1* | 5/2011 | Yoon et al. | 380/44 |
| 2011/0210831 A1* | 9/2011 | Talty et al. | 340/10.51 |
| 2011/0268274 A1* | 11/2011 | Qiu et al. | 380/270 |
| 2012/0084364 A1* | 4/2012 | Sivavakeesar | 709/205 |

FOREIGN PATENT DOCUMENTS

| | | | | |
|---|---|---|---|---|
| JP | 2005-244594 A | | 9/2005 | |
| JP | WO2009726639 | * | 6/2009 | H04L 9/08 |
| JP | WO2009116433 | * | 9/2009 | H04W 12/06 |
| JP | 2011-151507 A | | 8/2011 | |

* cited by examiner

COMMUNICATION APPARATUS, CONTROL METHOD FOR COMMUNICATION APPARATUS, AND PROGRAM

BACKGROUND OF THE INVENTION

1. Field of the Invention

The present invention relates to communication apparatuses that perform communication by sharing encryption keys.

2. Description of the Related Art

In a wireless LAN compliant with the IEEE 802.11 series of standards, an ad hoc mode is defined which allows communication apparatuses to directly communicate with one another without the use of an access point. Communication apparatuses communicating in the ad hoc mode can communicate with one another by automatically setting mutually different IP addresses using Auto IP. In Auto IP, IP addresses are specifically set as follows. First, a first communication apparatus sets a certain IP address and inquires whether or not there is another communication apparatus having that same IP address set therefor, using an ARP request. When it is detected that there is another communication apparatus having that same address set therefor, the first communication apparatus sets another IP address and inquires again whether or not there is another communication apparatus having that same IP address set therefor, using an ARP request. The above-described processing is repeated until an IP address is found for which there is no other communication apparatus having that same IP address set therefor. Thereby, communication apparatuses can set IP addresses which are different from one another. Here, IP stands for Internet Protocol and ARP stands for Address Resolution Protocol.

Further, in a wireless LAN, Wi-Fi Protected Access (WPA) is defined to increase network security. Communication apparatuses which join a WPA compliant network perform communication using encryption (hereinafter called encrypted communication).

However, there is no definition regarding a timing at which a terminal newly joining a WPA compliant network is to start encrypted communication, in the IEEE specifications (IEEE Computer Society, "IEEE Standard for Information technology—Telecommunication and information exchange between systems—Local and metropolitan area networks—Specific requirements, Part 11: Wireless LAN Medium Access Control (MAC) and Physical Layer (PHY) Specifications", IEEE Std 802.11-2007, Revision of IEEE Std 802.11-1999). Hence, there may be a case in which a communication apparatus starts encrypted communication in order to use Auto IP before an encryption key is shared with other communication apparatuses already belonging to an ad hoc network. In such a case, duplicate-IP-address detection processing using Auto IP cannot be performed correctly. In other words, when a communication apparatus transmits an ARP request using encryption, other communication apparatuses which do not share the encryption key cannot decrypt this ARP request, and hence cannot make an appropriate response. As a result, there may be a case in which the same IP address is set for a plurality of communication apparatuses, thereby prohibiting normal communication.

SUMMARY OF THE INVENTION

In consideration of the above-described problems, the present invention reduces the possibility that a communication apparatus performing encrypted communication is assigned the same address as another communication apparatus.

The present invention provides a communication apparatus that communicates with a plurality of other communication apparatuses, including: a sharing unit configured to share encryption keys for encrypting communication with the other communication apparatuses; and a starting unit configured to start processing for setting an address for the communication apparatus using encrypted communication when sharing of encryption keys with the plurality of the other communication apparatuses has been completed by the sharing unit.

According to the present invention, the possibility that a communication apparatus performing encrypted communication is assigned the same address as another communication apparatus is reduced.

Further features of the present invention will become apparent from the following description of exemplary embodiments with reference to the attached drawings.

DESCRIPTION OF THE EMBODIMENTS

First Embodiment

In the present embodiment, description will be made of a wireless LAN system in an ad hoc mode compliant with the IEEE 802.11 series of standards. The ad hoc mode described here is a communication mode in which communication apparatuses directly communicate with one another without the use of an access point. The present invention is not limited to this, and may be applied to any other communication method in which encrypted communication is performed by sharing encryption keys with all the communication apparatuses within a network.

Figure 1:
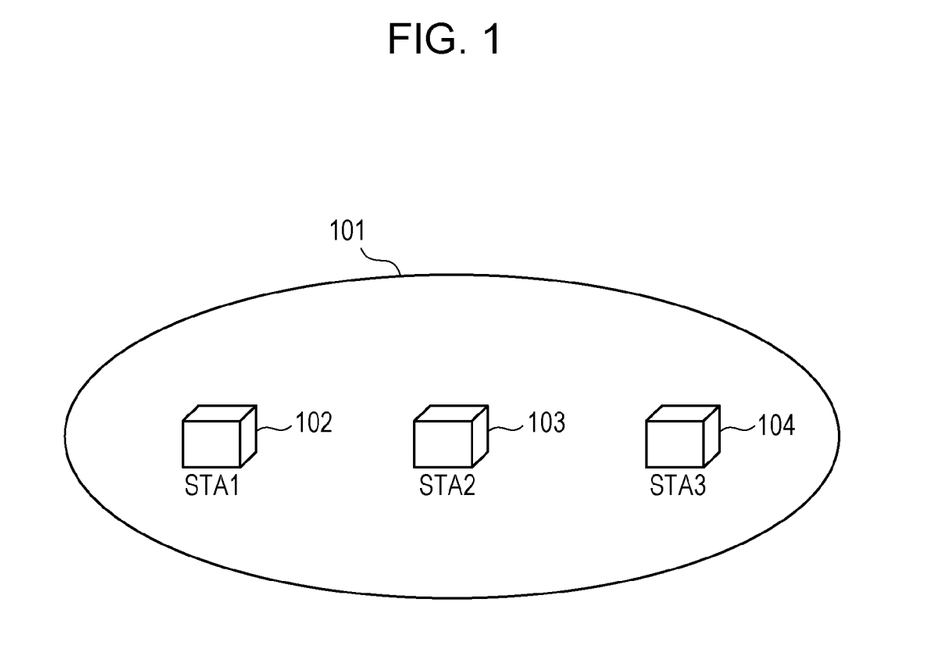
FIG. 1 is a diagram of a network configuration.

FIG. 1 illustrates a network configuration of a communication system according to the present embodiment. Reference numeral 101 denotes an ad hoc network compliant with WPA. Reference numeral 102 denotes a first communication apparatus (hereinafter called STA1) newly joining the ad hoc network 101. Reference numeral 103 denotes a second communication apparatus (hereinafter called STA2) belonging to the ad hoc network 101. Reference numeral 104 denotes a third communication apparatus (hereinafter called STA3) belonging to the ad hoc network 101 similarly to STA2. STA2 and STA3 become communication partners of STA1.

Figure 2:
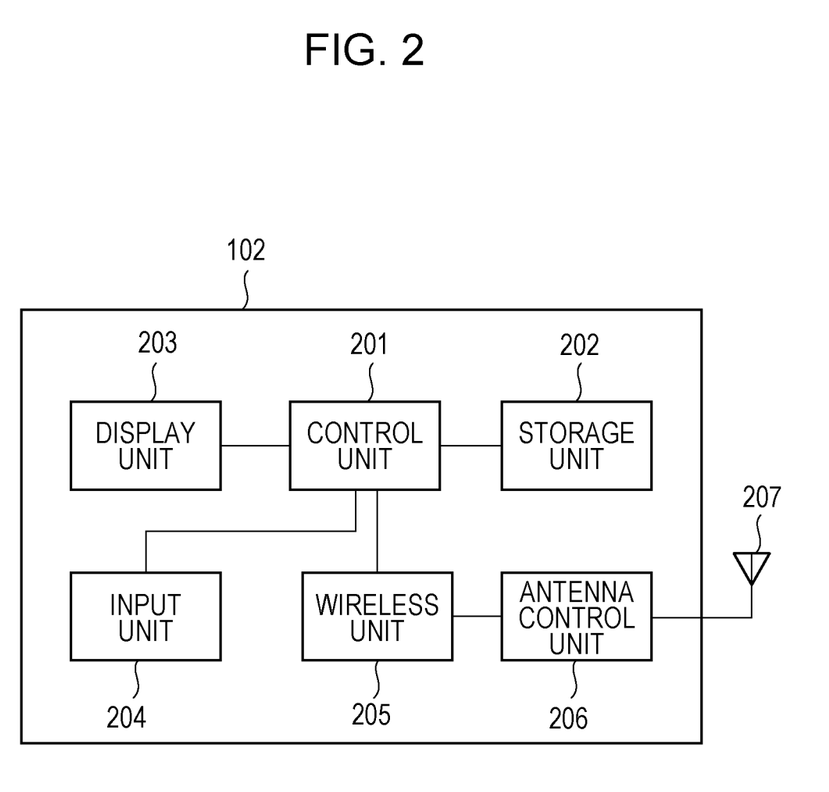
FIG. 2 is a hardware configuration diagram of STA1.

FIG. 2 illustrates a hardware configuration of STA1. Note that STA2 and STA3 also have configurations similar to that of STA1 in the present embodiment.

A control unit 201 is formed of a CPU and/or an MPU, and controls the whole STA1 by executing programs stored in a storage unit 202. The storage unit 202 is formed of a ROM and/or a RAM, and stores programs executed by the control unit 201 and various types of information such as encryption keys used to encrypt communication. Various operations to be described later are performed by the control unit 201 executing the programs stored in the storage unit 202. The storage unit 202 may be formed of storage media such as a flexible disk, a hard disk, an optical disk, a magneto optical disk, a CD-ROM, a CD-R, a magnetic tape, a nonvolatile memory card, and a DVD, in addition to memories such as a ROM and a RAM.

Reference numeral 203 denotes a display unit for displaying various things and has functions of outputting visually recognizable information as with an LCD or an LED and outputting sound as with a loudspeaker. Reference numeral 204 denotes an input unit which is formed of, for example, buttons and receives instructions from a user. Reference numeral 205 denotes a wireless unit for performing wireless communication in an ad hoc mode compliant with the IEEE 802.11 series of standards. Reference numeral 206 denotes an antenna control unit for controlling an antenna. Reference numeral 207 denotes an antenna controlled by the antenna control unit 206.

Figure 3:
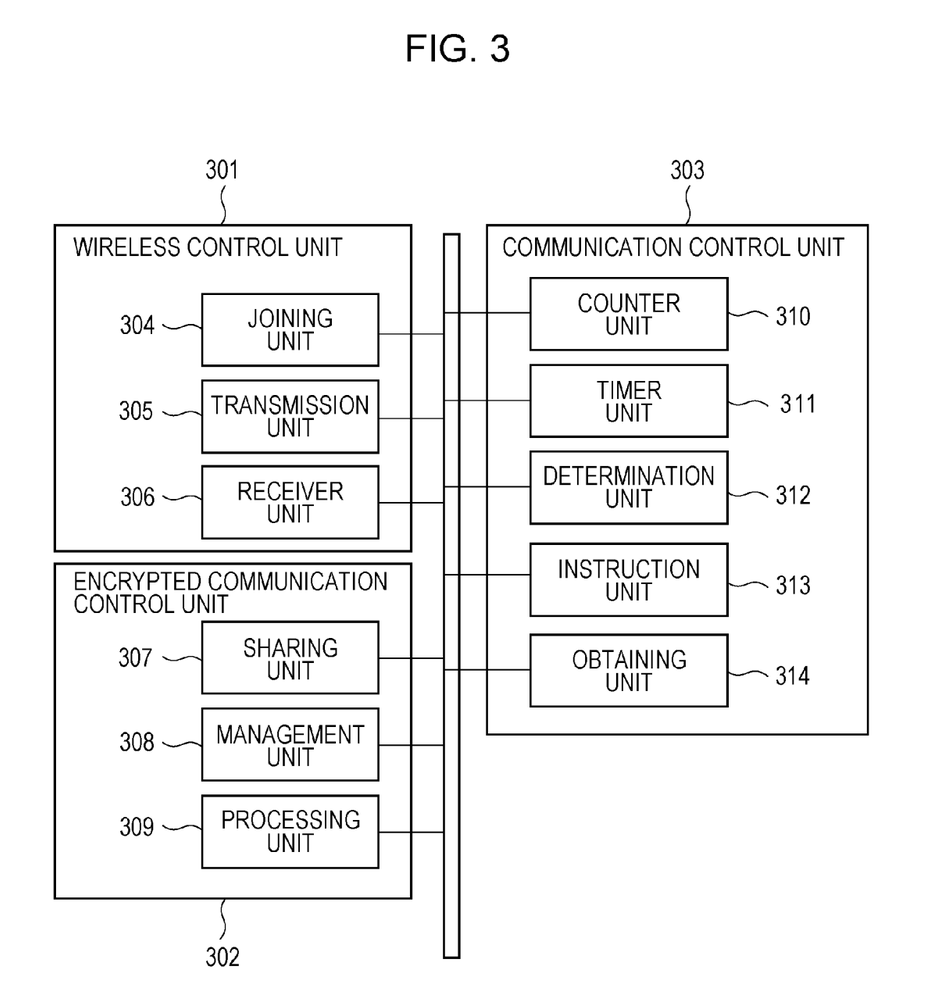
FIG. 3 is a software functional block diagram of STA1.

FIG. 3 illustrates software functional blocks realized by the control unit 201 reading programs stored in the storage unit 202 and controlling the wireless unit 205. Note that at least part of the software functional blocks illustrated in FIG. 3 may be realized using hardware. In the present embodiment, STA2 and STA3 also have software functional block configurations similar to that of STA1.

Reference numeral 301 denotes a wireless control unit for controlling the wireless unit 205 and includes functional blocks 304 to 306 to be described later. Reference numeral 302 denotes an encrypted communication control unit for controlling wireless encrypted communication and includes functional blocks 307 to 309 to be described later. Reference numeral 303 denotes a communication control unit for performing communication control of STA1 and includes functional blocks 310 to 314 to be described later.

Reference numeral 304 denotes a joining unit performing processing for joining the ad hoc network 101. Reference numeral 305 denotes a transmission unit which performs processing for transmitting an informing signal. In the present embodiment, a beacon compliant with the IEEE 802.11 series of standards is used as the informing signal. Reference numeral 306 denotes a receiver unit functioning as a detection unit that performs processing for receiving informing signals transmitted by communication apparatuses (STA2 and STA3) belonging to the ad hoc network 101.

Reference numeral 307 denotes a sharing unit which performs processing for sharing encryption keys with communication apparatuses belonging to the ad hoc network 101. Reference numeral 308 denotes a management unit that manages encryption keys shared using the sharing unit 307, the number of shared encryption keys held by STA1, existence/non-existence of an encryption key corresponding to each communication apparatus, and the like. Reference numeral 309 denotes a processing unit which encrypts packets and decrypts encrypted packets.

Reference numeral 310 denotes a counter unit which counts the number of received informing signals. Reference numeral 311 denotes a timer unit which measures an elapsed time from the time at which STA1 joined the ad hoc network 101. Reference numeral 312 denotes a determination unit which determines whether or not encryption keys have been shared with all the communication apparatuses (STA2 and STA3) belonging to the ad hoc network 101. In the present embodiment, the determination unit 312 determines whether or not encryption keys have been shared with all the detected communication apparatuses on the basis of receipt of beacons.

Reference numeral 313 denotes an instruction unit functioning as a starting unit which instructs processing for starting encrypted communication in the ad hoc network 101. In the present embodiment, the instruction unit 313 instructs starting of Auto IP. Auto IP is processing for setting mutually different IP addresses, and specifically includes the following operations. First, a first communication apparatus sets a certain IP address and inquires whether or not there is another communication apparatus having that same IP address set therefor, using an ARP request. When it is detected that there is another communication apparatus having that same IP address set therefor, the first communication apparatus sets another IP address and inquires again whether or not there is another communication apparatus having that same IP address set therefor, using an ARP request. The above-described processing is repeated until an IP address is found for which there is no other communication apparatus having that same IP address set therefor. Thereby, communication apparatuses can set IP addresses which are different from one another.

Reference numeral 314 denotes an obtaining unit for obtaining an upper limit N of the number of communication apparatuses to which another communication apparatus can be connected by ad hoc mode communication. Note that, in the present embodiment, the upper limit N is a number set by an application, but is not limited to this and may be a number specified by a user or a predetermined number.

Figure 4:
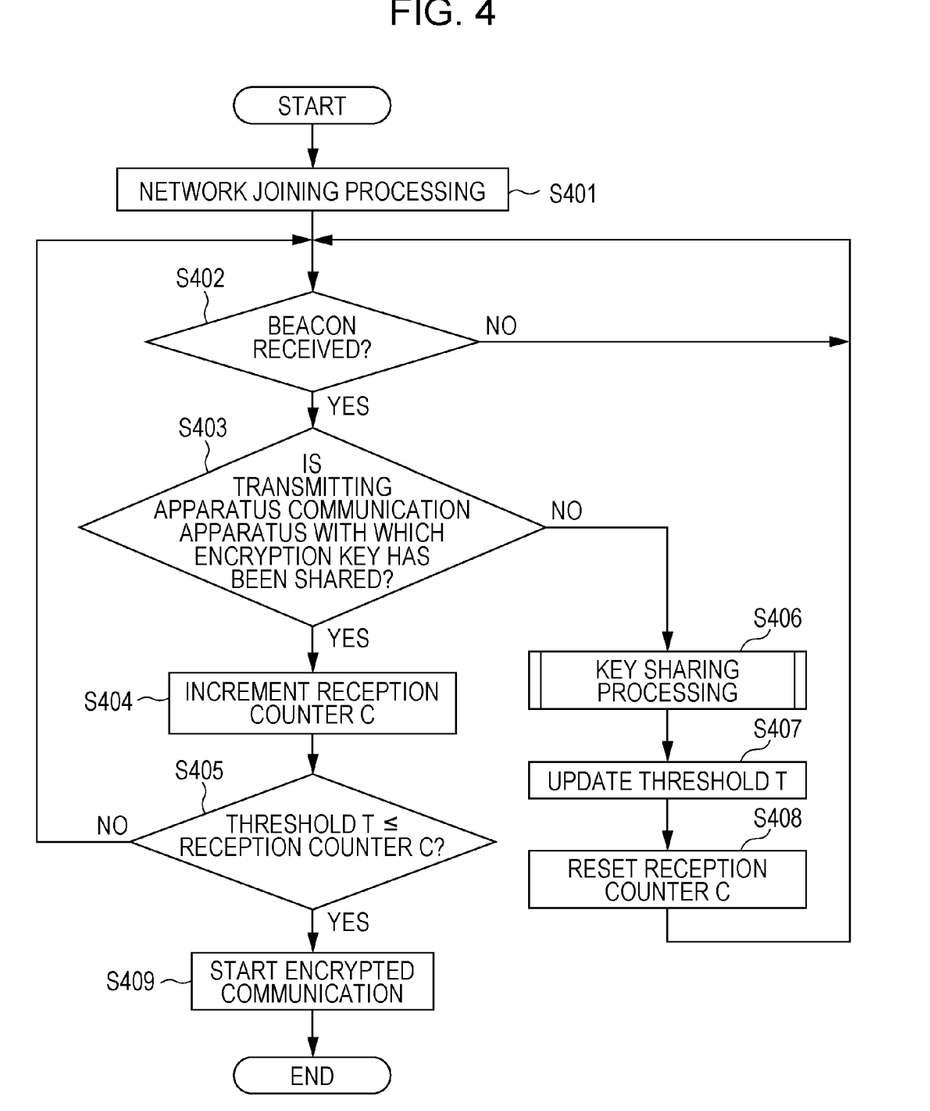
FIG. 4 is a flowchart of processing realized in STA1.
Figure 5:
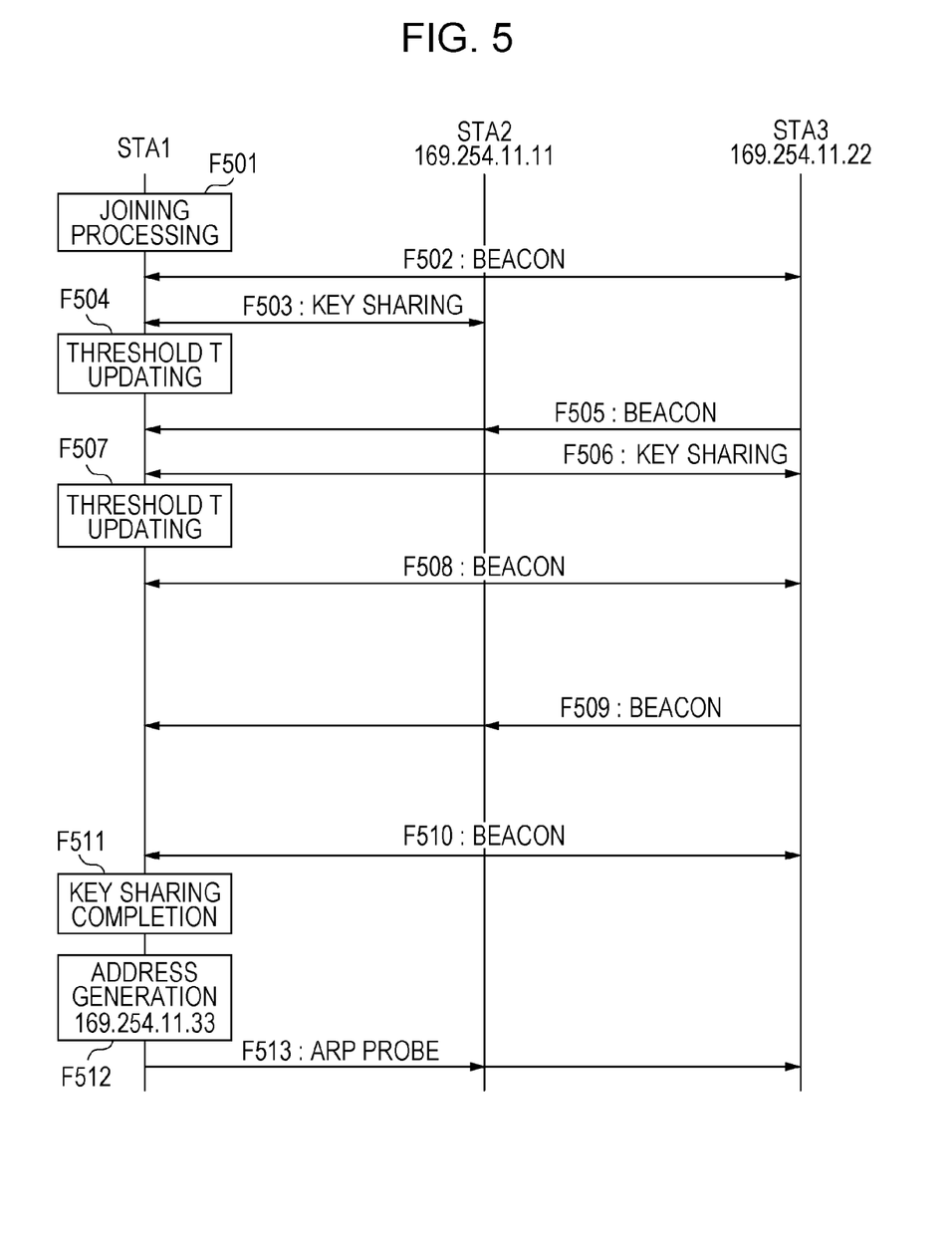
FIG. 5 is a sequence chart.

FIG. 4 is a flowchart of processing realized by the control unit 201 reading a program stored in the storage unit 202 when STA1 joins the ad hoc network 101. FIG. 5 is a sequence chart illustrating processing performed when STA1 is connected to the ad hoc network 101 formed of STA2 and STA3. Note that the flowchart and sequence chart may be realized using hardware.

The IP address of STA2 is set to 169.254.yy.yy, and the IP address of STA3 is set to 169.254.zz.zz. Regarding STA1, in the initial state, the number of held encryption keys K is set to zero, and a threshold T is set to one. Here, the threshold T is a threshold used to determine whether or not encryption key sharing with all the communication apparatuses (STA2 and STA3) within the ad hoc network 101 has been completed, and is calculated as "the number of held encryption keys K+1".

In step S401, the joining unit 304 performs processing for joining the ad hoc network 101 (F501). Here, the transmission unit 305 starts to transmit a beacon which is an example of an informing signal and STA1 joins the ad hoc network 101. Note that STA1 may join the ad hoc network 101 after authentication processing is performed between itself and STA2 and STA3 already belonging to the ad hoc network 101. At this time, since STA1 has not yet shared encryption keys with STA2 and STA3, STA1 cannot perform encrypted communication with STA2 and STA3.

When processing for joining the ad hoc network 101 is finished, the receiver unit 306 waits to receive beacons transmitted by other communication apparatuses (STA2 and STA3) (S402). Then, STA2 broadcasts a beacon in accordance with the specifications of the IEEE 802.11 series of standards (F502). Note that in the ad hoc mode compliant with the IEEE 802.11 series of standards, it is specified that the communication apparatuses which belong to the ad hoc network 101 sequentially transmit beacons with the same probability.

When a beacon is received from STA2, the management unit 308 determines whether or not STA1 has already shared an encryption key with a communication apparatus (transmitting apparatus STA2) which transmitted the received beacon (S403). Here, since an encryption key has not been shared, the sharing unit 307 performs processing for encryption key sharing (S406, F503). Note that encryption key sharing is performed using a 4-way handshake specified in WPA. Here, a 4-way handshake is performed twice: encryption key transmission from STA1 to STA2, and from STA2 to STA1. Thereby, the number of encryption keys K held by STA1 becomes one.

When the encryption key sharing has been completed, the management unit 308 updates the threshold T (S407, F504). The threshold is updated by using a value calculated on the basis of the current number of held encryption keys K. In the present embodiment, the threshold T is updated to "the number of held encryption keys K+1". Here, since the number of held encryption keys K is one, the threshold T is updated to two. Then, the counter unit 310 resets (sets to zero) a reception counter C which indicates the number of continuously received beacons (S408), and the flow goes back to a state of waiting for a beacon (S402).

Next STA3 broadcasts a beacon (F505). Upon receipt of the beacon from STA3, STA1 performs processing for encryption key sharing after determining that an encryption key has not yet been shared with STA3 (F506). When processing for encryption key sharing has been completed, the number of held encryption keys K becomes two. Hence, STA1 updates the threshold T from two to three (F507) and resets the reception counter C.

Then STA2 broadcasts a beacon (F508) similarly to F502. Upon receipt of the beacon from STA2, STA1 determines that encryption key sharing with STA2 has been completed (S403), and the counter unit 310 increments the reception counter C by one (S404). Here, the reception counter C becomes one. The determination unit 312 determines whether or not encryption key sharing with all the communication apparatuses belonging to the ad hoc network 101 has been completed by comparing the reception counter C with the threshold T (S405). Here, since the reception counter C (one) is less than the threshold T (three) (the reception counter C<the threshold T), STA1 enters a state of waiting for a beacon (S402).

Further, STA3 broadcasts a beacon similarly to F505 (F509). Upon receipt of the beacon from STA3, STA1 determines that encryption key sharing with STA3 has already been completed and increments the reception counter C. Here, since the reception counter C<the threshold T although the reception counter C becomes two, STA1 returns to a state of waiting for a beacon (S402).

Then STA2 broadcasts a beacon similarly to F502 and F508 (F510). Upon receipt of the beacon from STA2, STA1 determines that encryption key sharing with STA2 has already been completed and increments the reception counter C. Here, the reception counter C becomes three and comparison of the reception counter C with the threshold T shows that the reception counter C (three) is the threshold T (three) or above. Hence, the determination unit 312 determines that encryption key sharing with all the communication apparatuses within the ad hoc network 101 has been completed (S405).

When it is determined that encryption key sharing with all the communication apparatuses within the ad hoc network 101 has been completed, the instruction unit 313 instructs starting of encrypted communication, and STA1 starts encrypted communication (S409). Here, Auto IP is started and 169.254.xx.xx is generated as the IP address of STA1 (F512). When the IP address has been generated, STA1 broadcasts an ARP request which is a signal for checking duplication of IP addresses (F513).

Since STA1 has completed encryption key sharing with all the communication apparatuses (STA2 and STA3) within the ad hoc network 101, the communication apparatuses (STA2 and STA3) can receive the ARP request normally. Hence, the communication apparatuses (STA2 and STA3) can respond to the ARP request from STA1 normally, whereby processing for checking IP address duplication is performed normally.

In the above-described example, the number of communication apparatuses in an ad hoc network is estimated using the number of continuous informing signals received from communication apparatuses with which encryption keys have been shared, but the number of communication apparatuses may be estimated using the total number of received beacons after joining the ad hoc network. In addition, a method of estimating the number of communication apparatuses using Contention Window (CW) may be employed, for example.

Although the threshold T is made to be variable in the above-described example, the threshold T may be made to be a fixed value, such as the upper limit of the number of apparatuses allowed to join the ad hoc network.

In the present flowchart, although an example has been shown in which processing for estimating the number of communication apparatuses and processing for encryption key sharing are sequentially performed, processing for estimating the number of communication apparatuses and processing for encryption key sharing may be independently performed in parallel. In this case, an effect similar to that of the above-described sequential performance is obtained by preventing the start of communication even when the estimated number of communication apparatuses exceeds a threshold while there remains a communication apparatus with which encryption key sharing has not been completed.

As has been described above, encrypted communication is started by assuming that the number of held encryption keys is equal to the number of communication apparatuses within an ad hoc network when the number of informing signals continuously received from communication apparatuses whose encryption keys are already held has exceeded the threshold T. For example, Auto IP processing or encrypted data communication based on WPA performed by an application is started.

As a result, a problem can be reduced which is generated when encrypted communication is started without sharing encryption keys with all the apparatuses belonging to a network. For example, a problem is prevented in which Auto IP is started before sharing encryption keys with all the apparatuses belonging to a network, whereby Auto IP is not performed normally. In other words, a problem is prevented in which STA2 or STA3 cannot decrypt an ARP request transmitted from STA1 and, hence, an appropriate response cannot be made and duplication of IP addresses is generated between STA1 and STA2 or STA3.

Second Embodiment

In a second embodiment, description will be made of a case in which an upper limit N is set for the number of communication apparatuses to which another communication apparatus can be connected in an ad hoc mode. In the second embodiment, the upper limit N is determined by an instruction from an application of a communication apparatus. Note that the upper limit N may be made to be determined by an instruction from a user.

Since the configurations of a network system and communication apparatuses in the second embodiment are described in FIGS. 1 to 3 and are similar to those of the first embodiment, the same reference symbols are used and descriptions thereof are omitted.

Figure 6:
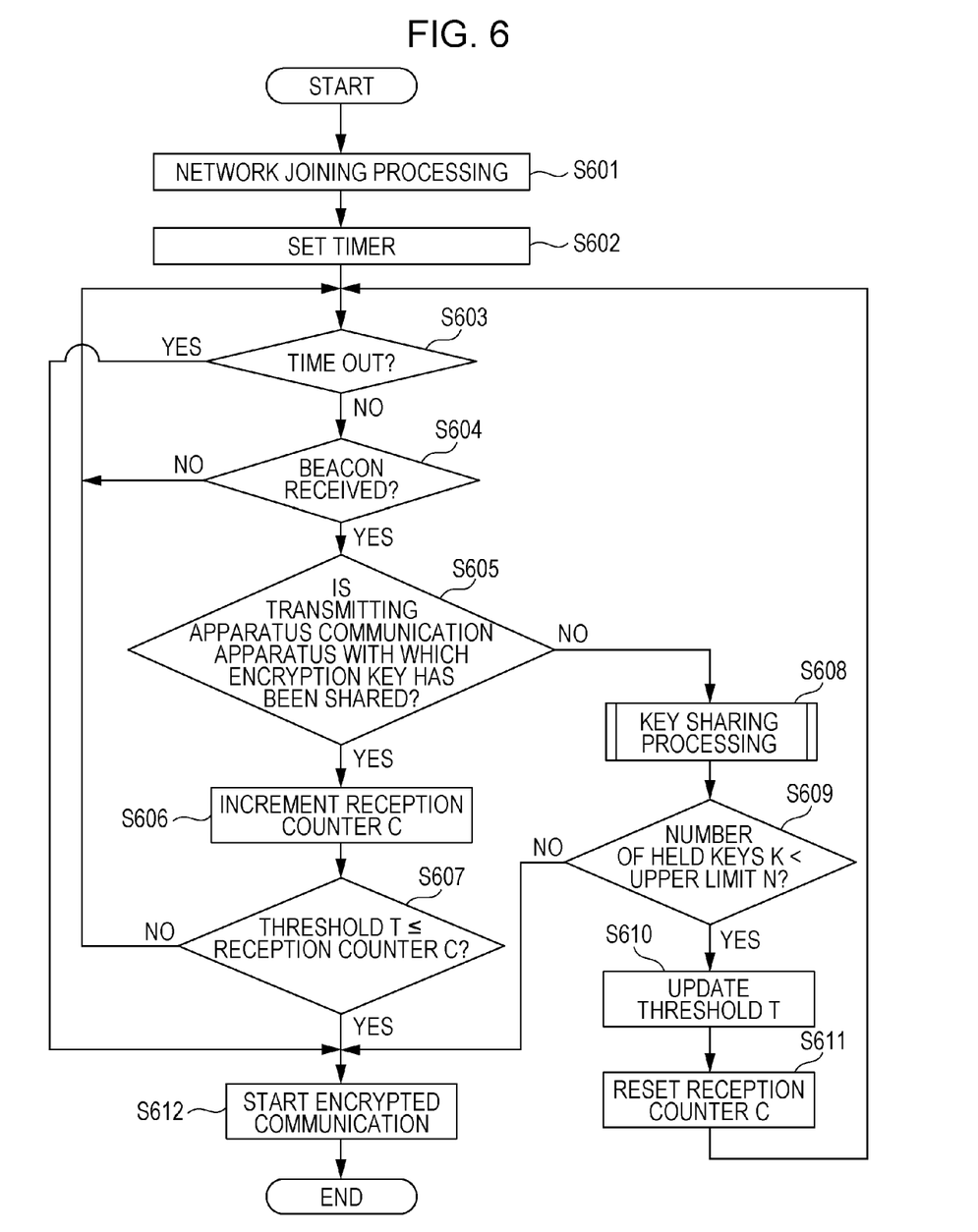
FIG. 6 is a flowchart of processing realized in STA1.
Figure 7:
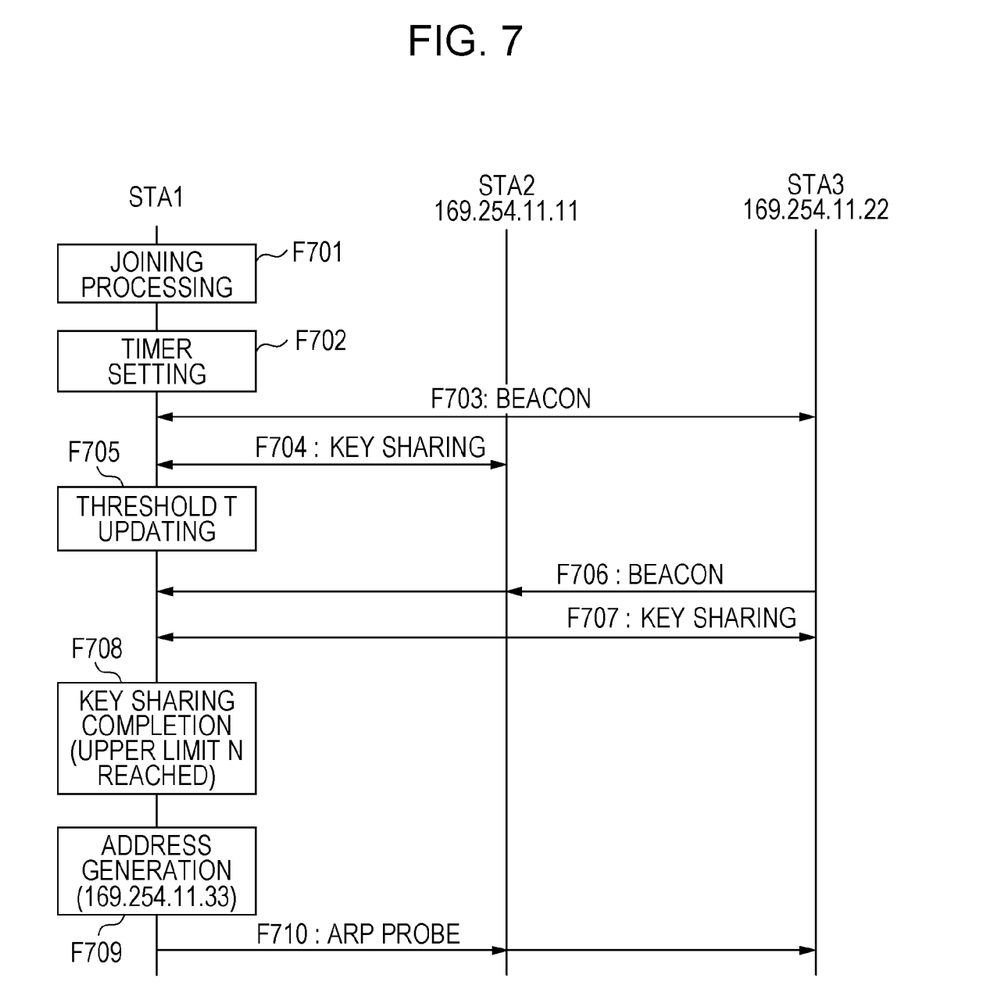
FIG. 7 is a sequence chart for the case where an upper limit N is two.

FIG. 6 is a flowchart of processing realized by the control unit 201 reading a program stored in the storage unit 202 when STA1 joins the ad hoc network 101. FIG. 7 is a sequence chart for the case in which the upper limit of the number of other communication apparatuses to which STA1 can be connected in an ad hoc mode is two.

In step S601, the joining unit 304 performs processing for joining the ad hoc network 101 (F701) similarly to step S401. In the present embodiment, STA1 obtains a transmission interval I between beacons in the ad hoc network 101 during the joining processing. Then the timer unit 311 sets a timer (S602, F702). Here the timer is used to count down a time required for N other communication apparatuses to transmit beacons, where N is the upper limit of the number of communication apparatuses to which STA1 can be connected in the ad hoc mode. In the present embodiment, the timer is set to a value calculated from the transmission interval I between beacons and the upper limit N (here, calculated as the product of the transmission interval I and the upper limit N).

Next, the timer unit 311 determines whether or not the timer set in step S602 has reached zero (S603). When it is determined that the timer has reached zero, the processing illustrated in FIG. 6 ends. Here, it is determined that the timer has not reached zero, and the flow proceeds to step S604 and the receiver unit 306 waits to receive a beacon transmitted by other communication apparatuses (STA2 and STA3). Then, STA2 broadcasts a beacon in accordance with the specifications of the IEEE 802.11 series of standards (F703). When the receiver unit 306 receives the beacon, the flow proceeds to step S605. When the beacon is not received, the flow goes back to step S603.

In step S605, similarly to step S403, the management unit 308 determines whether or not an encryption key has been shared with a communication apparatus (transmitting apparatus STA2) which transmitted the received beacon (S403). When it is determined that encryption key sharing has been completed, the communication control unit 303 increments the reception counter C (S606) similarly to step S404, and the determination unit 312 compares the reception counter C with the threshold T (S607) similarly to step S405. When the comparison result shows that the reception counter C has exceeded the threshold T, it is determined that encryption key sharing with all the communication apparatuses within the ad hoc network 101 has been completed and the flow proceeds to step S612. When the reception counter C has not yet exceeded the threshold T, the flow goes back to step S603.

Here, since encryption key sharing has not yet been performed, the sharing unit 307 performs processing for encryption key sharing in step S608 similarly to step S406 (F704). Thereby, the number of held encryption keys K becomes one.

When encryption key sharing has been completed, the determination unit 312 determines whether or not the number of held encryption keys K is smaller than the upper limit N (S609). When it is determined that the number of held encryption keys K is not smaller than the upper limit N (i.e., the number of held encryption keys K is the upper limit N or more), the processing illustrated in FIG. 6 ends. Here, since the number of held encryption keys K (one) is smaller than the upper limit N (two), the flow proceeds to step S611, and the management unit 308 updates the threshold T similarly to step S407. Here, the threshold T is updated to two, which is "the number of held encryption keys K+1" (F705). Then similarly to step S408, the counter unit 310 resets (sets to zero) the reception counter C which indicates the number of continuously received beacons (S611), and the flow goes back to step S603.

Then, in step S603, it is again determined that the timer has not reached zero and the flow proceeds to step S604, where the receiver unit 306 receives a beacon from STA3 (F706). Then it is determined that STA1 and STA3 have not yet shared an encryption key (S605), and processing for encryption key sharing is performed (S606, F707).

When processing for encryption key sharing has been completed, the determination unit 312 determines whether or not the number of held encryption keys K is smaller than the upper limit N (S609). Here, since the number of held encryption keys K (two) is the upper limit N (two) or more, the flow proceeds to step S612.

As has been described above, when it is determined that encryption key sharing with all the communication apparatuses within the ad hoc network 101 has been completed, the instruction unit 313 instructs starting of encrypted communication similarly to step S409, and STA1 starts encrypted communication (S612). Here, Auto IP is started and 169.254.11.33 is generated as the IP address of STA1 (F709). When the IP address has been generated, STA1 broadcasts an ARP request which is a signal for checking duplication of IP addresses (F710). Since STA1 has completed encryption key sharing with all the communication apparatuses within the ad hoc network 101, the communication apparatuses (STA2 and STA3) can receive the ARP request normally. Hence, the communication apparatuses (STA2 and STA3) can respond to the ARP request from STA1 normally, whereby processing for checking IP address duplication is performed normally.

Figure 8:
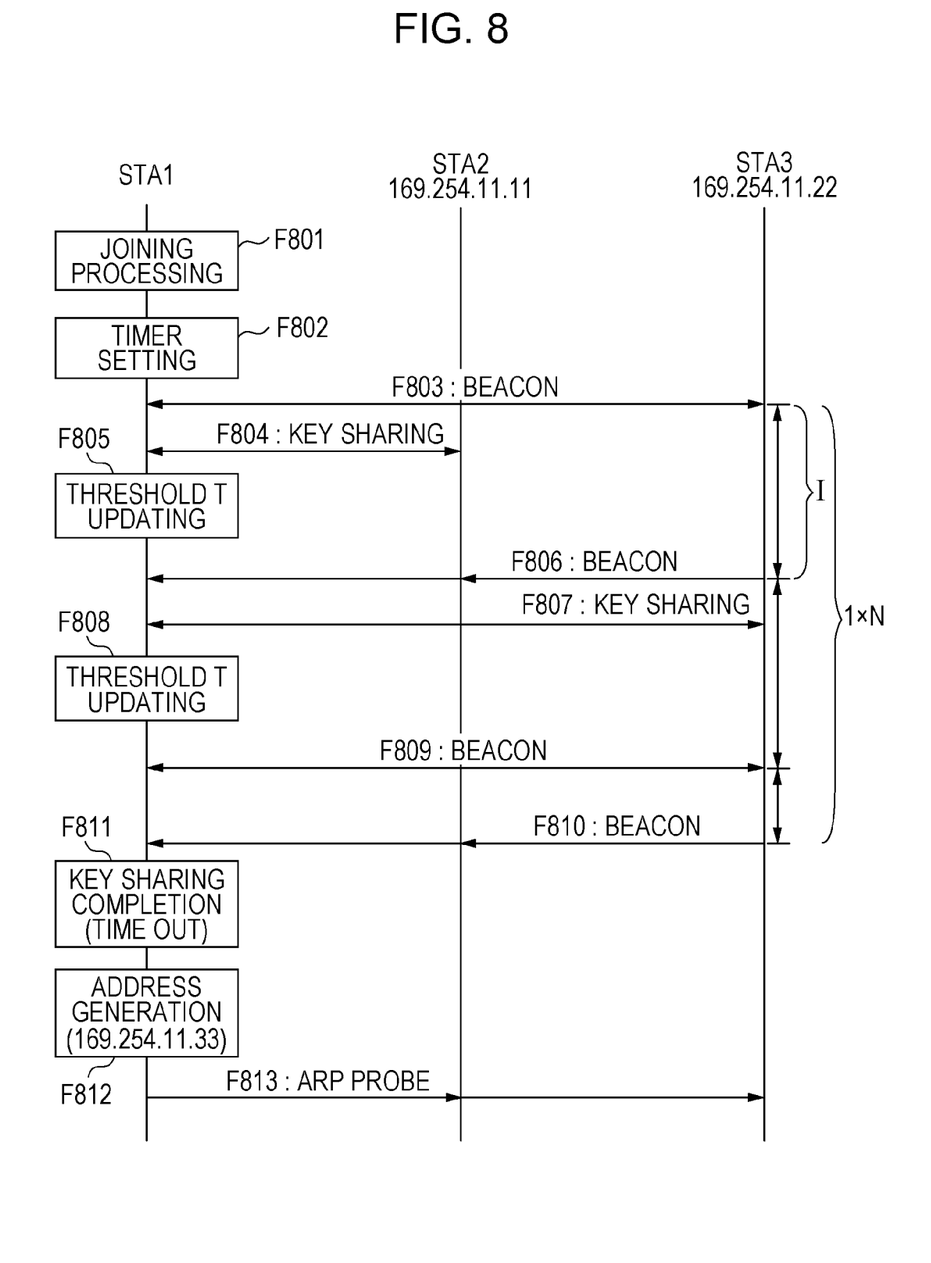
FIG. 8 is a sequence chart for the case where an upper limit N is three.

Next, FIG. 8 is a sequence chart for the case in which the upper limit of the number of other communication apparatuses to which STA1 can be connected in an ad hoc mode is three.

First, STA1 performs processing for joining the ad hoc network 101 (F801). When the joining processing has been completed, STA1 sets a timer (F802). In this example, since the upper limit N of the number of other communication apparatuses to which STA1 can be connected in the ad hoc mode is three, the reception counter C is set to I (transmission interval between beacons)×3. Then processing operations F803 to F807 similar to those of F703 to F707 are performed, and the number of held encryption keys K becomes two. The threshold T becomes three.

When the upper limit N is three, since the number of held encryption keys K (two) is smaller than the upper limit N (three), the threshold T is updated (F808) and the reception counter C is reset in STA1. After that, STA2 and STA3 broadcast beacons (F809, F810). Here, since STA1 has already shared encryption keys with STA2 and STA3, the reception counter C becomes three. At this stage, since the reception counter C (two) is smaller than the threshold T (three), the flow proceeds from step S607 to step S603 illustrated in FIG. 6. Then, it is determined in S603 that the timer has reached zero and the flow proceeds to step S612 (F811). After that, processing operations F812 and F813 are performed similarly to F709 and F710.

According to the second embodiment, when an upper limit is set for the number of communication apparatuses to which another communication apparatus can be connected, it is determined that processing for encryption key sharing has been completed on the basis of the fact that the number of held encryption keys has reached the upper limit or that a time calculated from the upper limit has elapsed. This allows a communication apparatus to determine that processing for encryption key sharing has been completed earlier than in the first embodiment, enabling a reduction in time required before starting communication. Note that an upper limit of the number of communication apparatuses connectable to a network may be used instead of the upper limit of the number of communication apparatuses to which another communication apparatus can be connected.

In the first and second embodiments, Auto IP is performed after performing processing for encryption key sharing with all the communication apparatuses detected in a network. However, when a broadcasting encryption key necessary for broadcasting an ARP request in a network is common among communication apparatuses in the network, it is not necessary to perform processing for encryption key sharing with all the communication apparatuses. This is because encrypted communication with all the communication apparatuses becomes possible only by performing processing for sharing the broadcasting encryption key with a single communication apparatus. Hence, when a broadcasting encryption key is common among communication apparatuses in a network, it is only required that Auto IP be performed after performing processing for sharing the broadcasting encryption key with a single communication apparatus. As a result, when a broadcasting encryption key is common among communication apparatuses in a network, the present invention can be easily realized with a reduced processing load.

When encrypted communication with a plurality of other communication apparatuses becomes possible as described above, processing for setting addresses for communication apparatuses is started. Since this allows the plurality of other communication apparatuses to decrypt encrypted communication, the possibility of setting an address that is the same as that of another communication apparatus is reduced.

Further, it is determined that encrypted communication has become possible between a communication apparatus and all the other communication apparatuses as communication partners in a network, on the basis of the fact that a predetermined time has elapsed. Hence, it can be easily determined that encryption keys have been shared with all the other communication apparatuses belonging to the network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-272701 filed Dec. 7, 2010, which is hereby incorporated by reference herein in its entirety.

What is claimed is:

1. A communication apparatus comprising:
   a sharing unit configured to share an encryption key for encrypted communication with a plurality of other communication apparatuses belonging to a network which the communication apparatus has joined;
   a management unit configured to manage a first number of communication apparatuses to which the communication apparatus is connected and a second number of other communication apparatuses with which the encryption key has been shared using the sharing unit;
   a determination unit configured to determine whether encrypted communication with the plurality of other communication apparatuses is possible based of the first number of communication apparatuses and the second number of other communication apparatuses managed by the management unit;
   a starting unit configured to start processing for setting an Internet Protocol (IP) address of the communication apparatus using encrypted communication with the shared key according to a result of the determination by the determination unit that the encryption key is shared with all of the plurality of the other communication apparatuses; and wherein the sharing unit, the management unit, the determination unit, and the starting unit are realized by a processor included in the communication apparatus configured to read a program stored in a memory and execute the program.

2. The communication apparatus according to claim 1 further comprising:
   a detection unit included in the program stored in memory and when executed by the processor is configured to detect the other communication apparatuses on the basis of informing signals from the other communication apparatuses.

3. The communication apparatus according to claim 1, wherein the determination unit determines that encrypted communication with the plurality of the other communication apparatuses is possible when a predetermined time has elapsed after the communication apparatus joined the network.

4. A method of controlling a communication apparatus comprising the following steps:
   sharing an encryption key for encrypted communication with a plurality of other communication apparatuses belonging to a network which the communication apparatus has joined;
   managing a first number of communication apparatuses to which the communication apparatus is connected and a second number of other communication apparatuses with which the encryption key has been shared during the sharing step;
   determining whether encrypted communication with the plurality of the other communication apparatuses is possible based on the first number of communication apparatuses and the second number of other communication apparatuses with which the encryption key has been shared; and
   starting processing for setting an Internet Protocol (IP) address of the communication apparatus using encrypted communication according to a result of the determining step that the encryption key is shared with all of the plurality of the other communication apparatuses; and
   wherein the sharing step, the management step, the determination step, and the starting step are realized by a processor included in the communication apparatus configured to read a program stored in a memory and execute the program.

* * * * *